(12) United States Patent
Joachim et al.

(10) Patent No.: US 10,695,995 B2
(45) Date of Patent: Jun. 30, 2020

(54) METHOD OF CORRECTING AN INAPPROPRIATE COUNTERSINK IN A COMPOSITE COMPONENT

(71) Applicant: AIRBUS HELICOPTERS DEUTSCHLAND GMBH, Donauworth (DE)

(72) Inventors: Thomas Joachim, Augsburg (DE); Andreas Rack, Burghausen (DE); Josef Lindenmeier, Buttenwiesen (DE); Tim Schoenicke, Treuchtlingen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 388 days.

(21) Appl. No.: 15/606,482

(22) Filed: May 26, 2017

(65) Prior Publication Data
US 2017/0341322 A1 Nov. 30, 2017

(30) Foreign Application Priority Data
May 26, 2016 (EP) ..................... 16400018

(51) Int. Cl.
*B32B 41/00* (2006.01)
*B29C 73/10* (2006.01)
(Continued)

(52) U.S. Cl.
CPC ............ *B29C 73/105* (2013.01); *B29C 73/06* (2013.01); *B29C 73/10* (2013.01); *B29C 73/30* (2013.01);
(Continued)

(58) Field of Classification Search
CPC ....... B29C 73/105; B29C 73/30; B29C 73/06; B29C 73/10; B32B 27/322; B32B 37/10;
(Continued)

(56) References Cited

U.S. PATENT DOCUMENTS 5,059,059 A 10/1991 Cox
2007/0177330 A1 8/2007 Ackerman et al.
(Continued)

FOREIGN PATENT DOCUMENTS

DE 19856395 6/2000
EP 2517865 10/2012
(Continued)

OTHER PUBLICATIONS

Extended European Search Report for European Application No. EP 16400018.4, Completed by the European Patent Office, dated Nov. 29, 2016, 6 Pages.

*Primary Examiner* — Michael N Orlando
*Assistant Examiner* — Joshel Rivera
(74) *Attorney, Agent, or Firm* — Brooks Kushman P.C.

(57) ABSTRACT

A method of correcting, in a composite component, an inappropriate countersink with an inappropriate maximum diameter and/or depth, the inappropriate countersink being provided in the composite component at a fixation opening having a first opening diameter, the method comprising at least the steps of: Preparing a repair patch; Arranging the repair patch on the composite component in an area surrounding the inappropriate countersink; Pressing the repair patch at least partly into the inappropriate countersink by means of an associated pressure tool; and Fixing the repair patch in the inappropriate countersink.

20 Claims, 4 Drawing Sheets

(51) Int. Cl.
  *B29C 73/06*     (2006.01)
  *B29C 73/30*     (2006.01)
  *B32B 27/32*     (2006.01)
  *B32B 37/10*     (2006.01)
  B29K 27/18       (2006.01)
  B29K 105/00      (2006.01)

(52) U.S. Cl.
  CPC ............ *B32B 27/322* (2013.01); *B32B 37/10* (2013.01); *B29K 2027/18* (2013.01); *B29K 2105/0097* (2013.01); *B29K 2105/256* (2013.01); *B32B 2327/18* (2013.01); *B32B 2405/00* (2013.01)

(58) Field of Classification Search
  CPC ............ B32B 2327/18; B32B 2405/00; B29K 2027/18; B29K 2105/0097; B29K 2105/256
  USPC ............ 156/60, 64, 350, 351, 378, 379
  See application file for complete search history.

(56)          References Cited

U.S. PATENT DOCUMENTS

2014/0141190 A1    5/2014   Shigetomi et al.
2014/0298956 A1    10/2014  Kerner

FOREIGN PATENT DOCUMENTS

EP           2927508       10/2015
WO           2015026798    2/2015

METHOD OF CORRECTING AN INAPPROPRIATE COUNTERSINK IN A COMPOSITE COMPONENT

CROSS-REFERENCE TO RELATED APPLICATIONS

This application claims priority to European patent application No. EP 16400018.4 filed on May 26, 2016, the disclosure of which is incorporated in its entirety by reference herein.

BACKGROUND OF THE INVENTION

Field of the Invention

The invention is related to a method of correcting, in a composite component, an inappropriate countersink with an inappropriate maximum diameter and/or depth, the inappropriate countersink being provided in the composite component at a fixation opening having a first opening diameter, the method comprising the features of claim 1. The invention is further related to a pressure tool for correcting, in a composite component, an inappropriate countersink with an inappropriate maximum diameter and/or depth, the pressure tool comprising the features of claim 15.

Description of Related Art

During assembly of composite components, usually multiple boreholes are drilled and provided with countersinks that are adapted for installation of countersunk fasteners. However, the countersinks are frequently inappropriately realized, i.e. with an inappropriate maximum diameter and/or depth. In other words, the countersinks are frequently too large-scaled and/or too deep.

These too large-scaled and/or too deep countersinks generally lead to an undesired and significant effort required for determining a residual safety margin provided by the finally assembled composite components. This, in turn, frequently leads to inappropriate and over-dimensioned correcting, i.e. repairing processes with high effort and low effective repair results, which usually only represent a concession that must necessarily be issued. This concession generally consists in the acceptance that a corrected, i.e. repaired countersink does not exhibit an original structure strength of the assembled composite components.

More specifically, for correcting, i.e. repairing an inappropriate countersink, current methods employ an indirect treatment of a corresponding affected area, which consists either in filling of a cavity defined by the inappropriate countersink by means of compound material, or in installing a repair patch on top of the inappropriate countersink. However, while the filling with compound material merely represents a cosmetic repair method, the installing of the repair patch requires additional design space in an area surrounding the inappropriate countersink. Nevertheless, both treatments are ineffective and unsatisfactory, as they can only provide for reduced bearing strength capabilities which are comparatively far below an original structure strength of the assembled composite components.

The document EP 2 927 508 A1 describes a method that consists in installing an additional dimpled washer respectively bushing in the inappropriate countersink. This additional dimpled washer respectively bushing exhibits on the one hand outer dimensions corresponding to those of the inappropriate countersink and on the other hand inner dimensions corresponding to a countersunk fastener that is originally provided for installation in the inappropriate countersink. However, this method does not contribute in repairing the inappropriate countersink, but merely allows using the inappropriate countersink with the originally provided countersunk fastener. Furthermore, this method is also ineffective and unsatisfactory, as is also only provides for reduced bearing strength capabilities which are comparatively far below an original structure strength of the assembled composite components.

BRIEF SUMMARY OF THE INVENTION

It is, therefore, an object of the present invention to provide a new method of correcting, in a composite component, an inappropriate countersink with an inappropriate maximum diameter and/or depth, the method being adapted for factually repairing an inappropriate countersink in a composite component with reduced effort by providing a comparatively similar to original structure strength. It is a further object of the present invention to provide a pressure tool that is suitable for use with this new method.

One object of the present invention is solved by a method of correcting, in a composite component, an inappropriate countersink with an inappropriate maximum diameter and/or depth with the features of claim 1.

More specifically, according to the invention a method of correcting, in a composite component, an inappropriate countersink with an inappropriate maximum diameter and/or depth is provided. The inappropriate countersink is provided in the composite component at a fixation opening having a first opening diameter. The method comprises at least the steps of: Preparing a repair patch with a repair patch opening having a second opening diameter that is at most equal to the first opening diameter; Arranging the repair patch on the composite component in an area surrounding the inappropriate countersink, such that the repair patch opening and the fixation opening are at least approximately aligned; Pressing the repair patch at least partly into the inappropriate countersink by means of an associated pressure tool; and Fixing the repair patch in the inappropriate countersink.

The inventive method is simple, efficient and comparatively low-cost and allows for directly correcting, i.e. factually repairing, inappropriate countersinks in a composite component. Advantageously, the inventive method can be applied to any helicopter composite structures, major airframes and all kind of non-structural composite components which have to be assembled by countersunk fasteners.

According to one aspect, the inventive method is performed using a wet lay-up lamination process with bi-directional fabric and different laminating systems. Advantageously, this method requires comparatively few effort and is suitable for providing an at least essentially similar to original structure strength.

According to a preferred embodiment, the method further comprises at least the steps of: Preparing a polytetrafluoroethylene tape with a polytetrafluorethylene tape opening having a third opening diameter that corresponds at least approximately to the inappropriate maximum diameter of the inappropriate countersink; and Arranging the polytetrafluorethylene tape on the composite component in the area surrounding the inappropriate countersink, prior to arranging the repair patch on the composite component, such that the polytetrafluoroethylene tape opening and the fixation opening are at least approximately aligned, wherein the polytetrafluorethylene tape is arranged between the repair patch and the composite component.

According to a further preferred embodiment, the step of pressing the repair patch at least partly into the inappropriate countersink comprises at least the steps of: Positioning a conical extension of the pressure tool over the repair patch such that the conical extension is aligned with the inappropriate countersink, wherein the conical extension is provided with dimensions that correspond at least approximately to inverted appropriate countersink dimensions; and Pressing the pressure tool onto the repair patch such that the conical extension presses an inner portion of the repair patch into the inappropriate countersink.

According to a further preferred embodiment, the method further comprises at least the step of attaching, in a releasable manner, the pressure tool to the composite component by means of an associated clamping unit.

According to a further preferred embodiment, the associated clamping unit comprises at least one screw that traverses the pressure tool and the conical extension, the repair patch, the polytetrafluorethylene tape and the composite component.

According to a further preferred embodiment, the step of attaching the pressure tool to the composite component comprises at least the steps of: If an opposite component that is to be mounted to the composite component is not already arranged on a surface of the composite component that is opposed to a surface where the repair patch is arranged, arranging the opposite component on the surface of the composite component that is opposed to the surface where the repair patch is arranged; and Fixing the associated clamping unit at the opposite component.

According to a further preferred embodiment, the step of preparing the repair patch comprises preparing a wet laminate repair patch, wherein the step of fixing the repair patch in the inappropriate countersink comprises curing the wet laminate repair patch in the inappropriate countersink.

According to a further preferred embodiment, the step of preparing the wet laminate repair patch comprises fabricating the wet laminate repair patch with a basically quasi isotropic layup.

According to a further preferred embodiment, fabricating the wet laminate repair patch with the basically quasi isotropic layup comprises stacking of at least three pre-cut fiber fabric layers having 0°/90°, +/−45° and 0°/90° fiber orientations.

According to a further preferred embodiment, the method further comprises at least the step of removing any excessive repair patch portions from the composite component.

According to a further preferred embodiment, the step of removing any excessive repair patch portions comprises grinding the composite component at least in the area surrounding the inappropriate countersink.

According to a further preferred embodiment, the method further comprises at least the step of creating an appropriate countersink with appropriate countersink dimensions subsequent to removing any excessive repair patch portions from the composite component.

According to a further preferred embodiment, the method further comprises at least the step of activating the inappropriate countersink prior to arranging the repair patch on the composite component.

According to a further preferred embodiment, the step of preparing the repair patch comprises preparing the repair patch with a structure strength that corresponds at least approximately to an underlying structure strength of the composite component.

The other object of the present invention is solved by a pressure tool for correcting, in a composite component, an inappropriate countersink with an inappropriate maximum diameter and/or depth. The pressure tool comprises a conical extension that is provided with dimensions that correspond at least approximately to inverted appropriate countersink dimensions

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
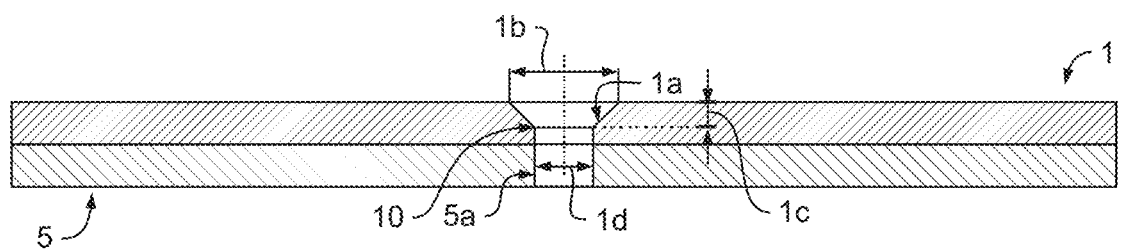
FIG. 1 shows a sectional view of an exemplary composite component with an appropriate countersink.

FIG. 1 shows a composite component 1 with a countersink 1a having a maximum diameter 1b and/or depth 1c. By way of example, the countersink 1a defines an appropriate countersink. It should be noted that the term "appropriate countersink" is used in the context of the present application to designate a countersink having an intended predetermined maximum diameter and/or depth and, thus, an appropriate maximum diameter and/or depth.

Illustratively, the appropriate countersink 1a extends into a fixation opening 10, i.e. the fixation opening 10 is provided with the appropriate countersink 1a. The fixation opening 10 exemplarily comprises a fixation opening diameter 1d.

The fixation opening 10 and the appropriate countersink 1a preferentially define a through hole in the composite component 1 and are preferably adapted for accommodating an associated countersunk fastener, such as e.g. a screw or a bolt. The latter is preferentially adapted for mounting the composite component 1 to an opposite component 5 having a fastener reception opening 5a that also comprises the fixation opening diameter 1d, similar to the fixation opening 10 provided in the composite component 1. The fastener reception opening 5a preferably defines a through hole in the opposite component 5.

Preferably, the opposite component 5 is embodied as a composite component similar to the composite component 1. However, the opposite component 5 is not limited to composite components and an arbitrarily selected other material can be used for implementing the opposite component 5.

Figure 2:
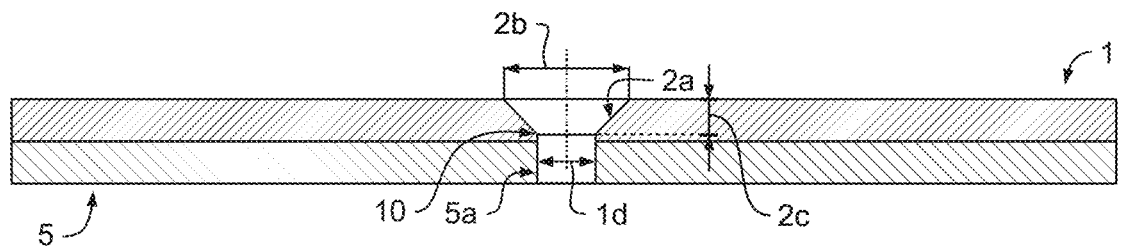
FIG. 2 shows the exemplary composite component of FIG. 1 with an inappropriate countersink.

FIG. 2 shows the composite component 1 with a countersink 2a having a maximum diameter 2b and/or depth 2c. By way of example, the countersink 2a defines an inappropriate countersink. The inappropriate countersink 2a also extends into the fixation opening 10 with the fixation opening diameter 1d of FIG. 1. The fixation opening 10 and the inappropriate countersink 2a preferentially define a through hole in the composite component 1. As described above with reference to FIG. 1, the composite component 1 is again adapted for being mounted to the opposite component 5 having the fastener reception opening 5a that also comprises the fixation opening diameter 1d, similar to the fixation opening 10 provided in the composite component 1.

It should be noted that the term "inappropriate countersink" is used in the context of the present application to designate a countersink having an excessive, i.e. too large maximum diameter and/or depth compared to an intended predetermined maximum diameter and/or depth and, thus, an inappropriate maximum diameter and/or depth. Illustratively, the inappropriate countersink 2a comprises an inappropriate maximum diameter 2b as it is greater than the appropriate maximum diameter 1b of FIG. 1, and the inappropriate countersink 2a comprises an inappropriate maximum depth 2c as it is deeper than the appropriate maximum depth 1c of FIG. 1.

Figure 3:
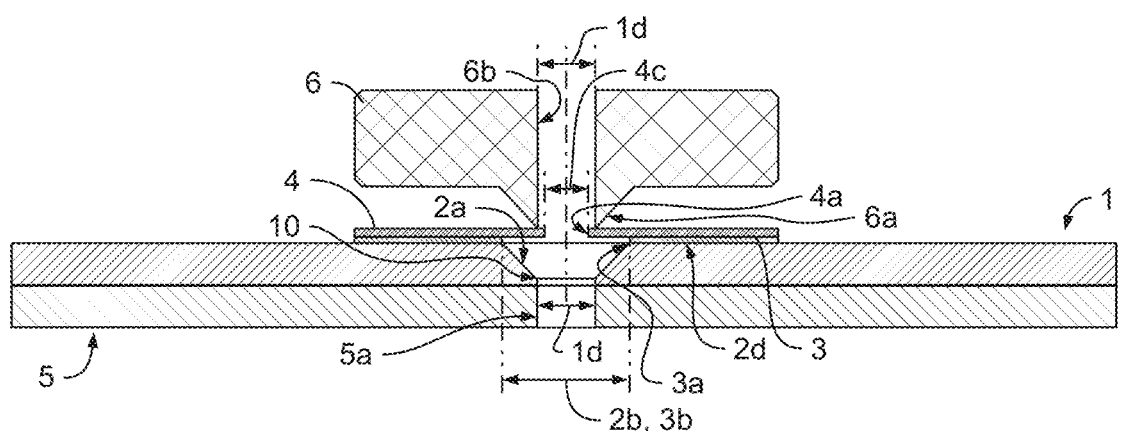
FIG. 3 to FIG. 5 illustrate an exemplary method of correcting the inappropriate countersink of FIG. 2, FIG. 6 to FIG. 11 illustrate an exemplary method of manufacturing a repair patch that is suitable for correcting the inappropriate countersink of FIG. 2.

FIG. 3 illustrates initial, preparatory steps of a method of correcting, in the composite component 1 of FIG. 2, the inappropriate countersink 2a with the inappropriate maximum diameter 2b and/or depth 2c. This method aims to modify the inappropriate countersink 2a structurally into the appropriate countersink 1a of FIG. 1 prior to mounting the composite component 1 to the opposite component 5.

According to one aspect, initially a tape 3 with a tape opening 3a having an associated opening diameter 3b is prepared. The associated opening diameter 3b preferably corresponds at least approximately to the inappropriate maximum diameter 2b of the inappropriate countersink 2a and is, preferentially, at least not smaller than the inappropriate maximum diameter 2b. The tape 3 is preferably a polytetrafluorethylene (PTFE) tape.

Furthermore, a repair patch 4 with a repair patch opening 4a having a repair patch opening diameter 4c is prepared as described in detail below with reference to FIG. 7 to FIG. 10. The repair patch 4 is preferably prepared with a structure strength that corresponds at least approximately to an underlying structure strength of the composite component 1. The repair patch opening diameter 4c is preferably at most equal to the fixation opening diameter 1d of the fixation opening 10 of FIG. 1, preferentially at least within conventional predetermined manufacturing tolerances.

According to one aspect, the PTFE tape 3 and the repair patch 4 are prepared and manufactured separately. This can be done simultaneously, or completely independent of each other.

The PTFE tape 3 is then arranged on the composite component 1 in an area 2d surrounding the inappropriate countersink 2a, such that the tape opening 3a and the fixation opening 10 are at least approximately aligned and, preferably, coaxially arranged. Furthermore, the repair patch 4 is arranged on the composite component 1 in the area 2d surrounding the inappropriate countersink 2a, such that the repair patch opening 4a and the fixation opening 10 are at least approximately aligned and, preferably, coaxially arranged.

According to one aspect, the PTFE tape 3 is arranged in the area 2d on the composite component 1 prior to arranging the repair patch 4 on the composite component 1. This is preferably done for surface protection of the area 2d. In other words, the PTFE tape 3 is preferably arranged on the composite component 1 in the area 2d surrounding the inappropriate countersink 2a such that the PTFE tape 3 is arranged between the repair patch 4 and the composite component 1.

Preferably, the inappropriate countersink 2a is activated, e.g. by hand using sandpaper, and then cleaned prior to arranging the repair patch 4 on the composite component 1, i.e. on the PTFE tape 3. This activation and cleaning can also be performed prior to arranging the PTFE tape 3 on the composite component 1. However, it should be noted that such an activation and cleaning is a well-known process that is preferably performed according to respectively valid and applicable activating and cleaning standards and, therefore, not described in detail for brevity and conciseness.

Then, a pressure tool 6 and, more specifically, a conical extension 6a of the pressure tool 6 is positioned over the repair patch 4, i.e. illustratively above the composite component 1, such that the conical extension 6a is aligned, preferably coaxially arranged, with the inappropriate countersink 2a. The conical extension 6a preferentially comprises dimensions that correspond at least approximately to inverted appropriate countersink dimensions, i.e. to respective dimensions of the appropriate countersink 1a of FIG. 1.

Preferably, the pressure tool 6 further comprises a tool opening 6b, which preferentially defines a through hole through the pressure tool 6 and its conical extension 6a. The tool opening 6b is preferably embodied for enabling accommodation of an associated clamping unit (7 in FIG. 4).

Figure 4:
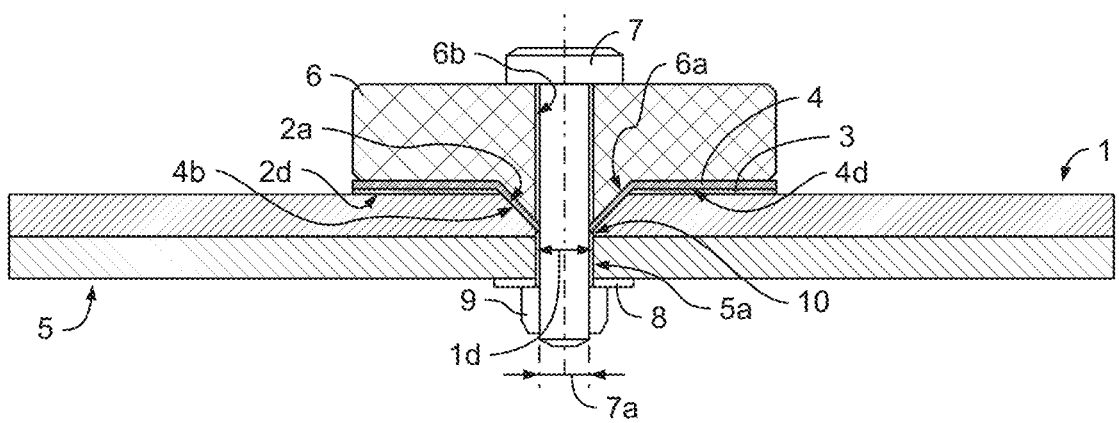

FIG. 4 illustrates additional steps of the method of correcting, in the composite component 1 of FIG. 2, the inappropriate countersink 2a with the inappropriate maximum diameter 2b and/or depth 2c. These additional steps are preferably performed after the initial, preparatory steps described above with reference to FIG. 3, according to which the PTFE tape 3, the repair patch 4 and the pressure tool 6 were arranged on the composite component 1, which should subsequently be mounted to the opposite component 5 of FIG. 3.

In this respect, it should be noted that the opposite component 5 is illustrated in FIG. 1 to FIG. 4 as being arranged on a surface of the composite component 1 that is opposed to a surface where the repair patch 4 is arranged. If, however, the opposite component 5 that is to be mounted to the composite component 1 is not already arranged on this surface of the composite component 1 that is opposed to the surface where the repair patch 4 is arranged, the opposite component 5 is arranged on this surface of the composite component 1 that is opposed to the surface where the repair patch 4 is arranged, prior to continuing the additional steps of the method of correcting the inappropriate countersink 2a.

According to one aspect, pressure is applied to the pressure tool 6 and, thus, onto the repair patch 4, such that the repair patch 4 is at least partly pressed into the inappropriate countersink 2a. More specifically, by applying pressure to the pressure tool 6, the conical extension 6a of the pressure tool 6 presses an inner portion of the repair patch 4 into the inappropriate countersink 2a, i.e. against an inner area 4b of the inappropriate countersink 2a.

In order to maintain a given pressure on the pressure tool 6, the latter is attached, preferably in a releasable manner, to the composite component 1, and preferentially also to the opposite component 5, by means of an associated clamping unit 7. The latter is preferably fixed at the opposite component 5, as described below.

According to one aspect, the associated clamping unit 7 comprises at least one screw or bolt that traverses the pressure tool 6 and its conical extension 6a, the repair patch 4, the PTFE tape 3 and the composite component 1. More specifically, the at least one screw or bolt 7 is retained in the tool opening 6b, the fixation opening 10 and the fastener reception opening 5a by means of an associated nut 9 and exhibits a screw or bolt diameter 7a that amounts at most to the fixation opening diameter 1d of the fixation opening 10. Preferably, the nut 9 pushes a washer 8 against the opposite component 5.

It should be noted that the repair patch 4 should preferentially only be pressed softly into the inappropriate countersink 2a in order to avoid an undesired, too strong squeezing thereof. Therefore, the nut 9 is preferably only tightened by hand without use of any additional tightening tool.

Finally, the repair patch 4 is fixed in the inappropriate countersink 2a. This is preferably performed by means of curing, which is a well-known process and, therefore, not described in detail for brevity and conciseness. Preferentially, the curing is performed in room temperature condition or under heat without vacuum, during at least 24 hours and in clamped condition, i.e. by applying mechanical pressure by means of the associated clamping unit 7.

It should be noted that after this curing, the repair patch 4 still comprises an outer region that is arranged on the PTFE tape 3 and that defines excessive repair patch portions 4d that are not required for correcting, i.e. repairing the inappropriate countersink 2a. Consequently, these excessive repair patch portions 4d can be removed subsequently, as described hereinafter with reference to FIG. 5.

Figure 5:
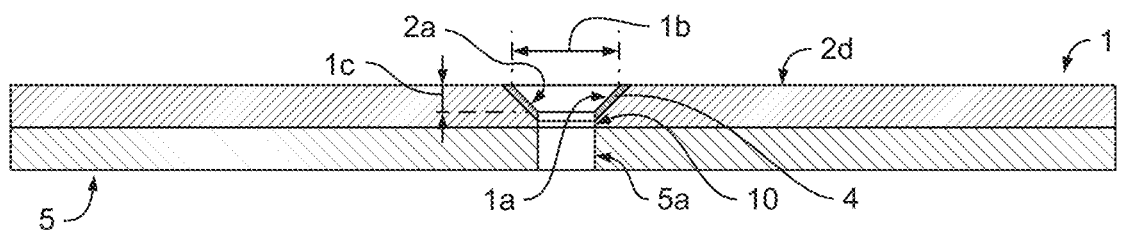

FIG. 5 shows the composite component 1 and the opposite component 5 of FIG. 4 after removal of the pressure tool 6, the at least one screw or bolt 7, the nut 9 and the washer 8. FIG. 5 further illustrates a final step of the method of correcting, in the composite component 1 of FIG. 2, the inappropriate countersink 2a with the inappropriate maximum diameter 2b and/or depth 2c.

This final step is preferably performed after the additional steps described above with reference to FIG. 4 and consists in removing at least the excessive repair patch portions 4d of FIG. 4 and, preferentially, also the PTFE tape 3 from the composite component 1. Removing at least the excessive repair patch portions 4d preferably comprises grinding the composite component 1 at least in the area 2d surrounding the inappropriate countersink 2a. The PTFE tape 3 can be removed in the same manner.

Preferably, the final step should be performed in order to restore an original surface condition. In other words, the surface of the composite component 1 should have the same quality after having corrected, i.e. repaired the inappropriate countersink 2a, as before.

According to one aspect, if required, an appropriate countersink with appropriate countersink dimensions can be created at the location of the inappropriate countersink 2a. This is preferably performed subsequent to removing any excessive repair patch portions 4d from the composite component 1.

Figure 6:
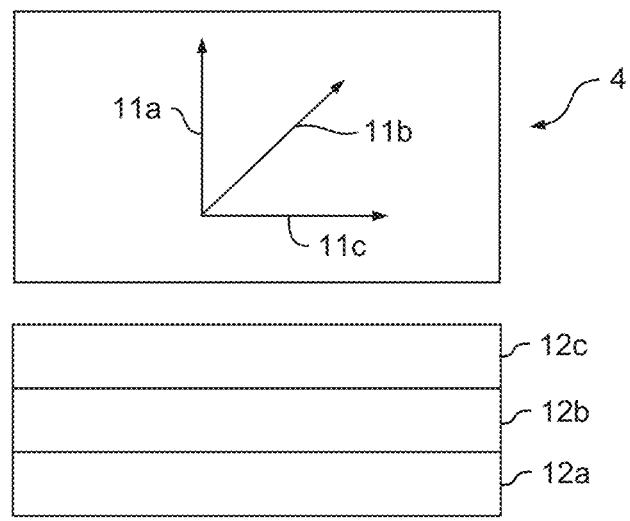

FIG. 6 shows the repair patch 4 of FIG. 3 to FIG. 5 for illustrating an exemplary layup. Preferably, the repair patch 4 is embodied as a laminating system that is based on a pre-cut fiber-reinforced textile fabric and, preferentially, mixed according to respectively valid and applicable standards, which are well-known to the person skilled in the art and, therefore, not explained in greater detail, for brevity and conciseness.

According to one aspect, a certain size of the fiber-reinforced textile fabric, preferably a carbon fiber textile fabric, is cut out depending on the inappropriate diameter 2b and depth 2c of the inappropriate countersink of FIG. 2. On the basis of this cut-out carbon fiber textile fabric, preferably impregnated, i.e. wet patch plies and, more specifically, wet laminate patch plies can be created as described below with reference to FIG. 7 and FIG. 8, wherefrom the repair patch 4 can be extracted by cutting or using a hollow punch as described below with reference to FIG. 9. In other words, the repair patch 4 is preferably prepared as a wet laminate repair patch and, therefore, also referred to as the "wet laminate repair patch 4" hereinafter.

According to one aspect, the layup of the wet laminate repair patch 4 is preferentially basically quasi isotropic and comprises at least three pre-cut fiber fabric layers 12a, 12b, 12c with associated fiber orientations 11a, 11b, 11c, wherein the at least three pre-cut fiber fabric layers 12a, 12b, 12c are preferably stacked on each other with 0°/90°, +/−45° and 0°/90° fiber orientations. Respectively selected fiber orientations preferably follow either an outer visible original play of the composite component 1 of the preceding figures, or a basic coordinate system of an underlying structure, wherein the wet laminate repair patch 4 should be used.

Figure 7:
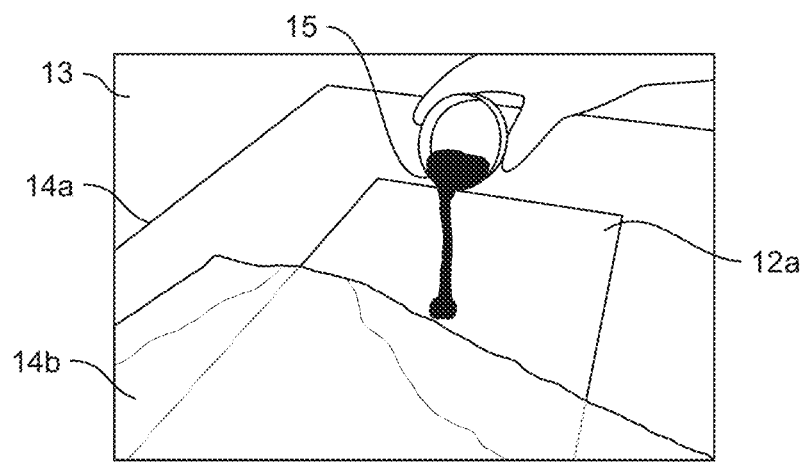
Figure 8:
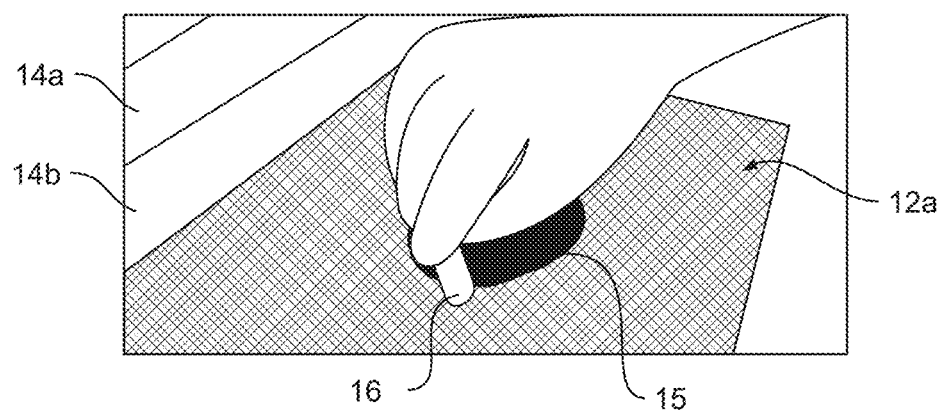

FIG. 7 and FIG. 8 illustrate steps of a method of fabricating the wet laminate repair patch 4 of FIG. 3 to FIG. 5 with a basically quasi isotropic layup, as mentioned above with reference to FIG. 6. The method preferably starts according to FIG. 7 by arranging the PTFE foil 14a on a suitable fabrication support 13, i.e. a workbench. If applicable, the PTFE foil 14a can be wetted with a thin resin film.

Then, a pre-cut fiber fabric layer, e.g. the pre-cut fiber fabric layer 12a of FIG. 6, is applied, i.e. positioned on the wetted PTFE foil 14a. Subsequently, a resin 15 is applied to, e.g. spilled on, the pre-cut fiber fabric layer 12a such that a preferred fabric to resin ratio of 50/50 ppw is preferably obtained.

The resin 15 is preferably equally distributed into the pre-cut fiber fabric layer 12a by means of a suitable tool (e.g. spatula 16 in FIG. 8), in order to remove enclosed air. Then, a PTFE foil 14b is applied onto the wetted pre-cut fiber fabric layer 12a and the suitable tool is preferentially cleaned.

As illustrated in FIG. 8, the suitable tool, which is exemplarily illustrated as a spatula 16, is then applied to the PTFE foil 14b that covers the wetted pre-cut fiber fabric layer 12a. Preferably, the spatula 16 is moved from a middle position straight outwards with slight pressure in order to squeeze out entrapped air and excessive resin 15. This is preferentially performed until the pre-cut fiber fabric layer 12a is homogenously impregnated with the resin 15.

It should be noted that the spatula 16 is merely illustrated by way of example and not for limiting the present invention accordingly. Instead, other suitable tools may likewise be used, such as e.g. a roller.

According to one aspect, the method steps that are described above with reference to FIG. 7 and FIG. 8 are repeated for the pre-cut fiber fabric layers 12b, 12c, so that both of them are also wetted with the resin 15 and covered by the PTFE foils 14a, 14b. As a result, all of the pre-cut fiber fabric layers 12a, 12b, 12c are enclosed within the PTFE foils 14a, 14b and homogeneously impregnated with the resin 15.

Figure 9:
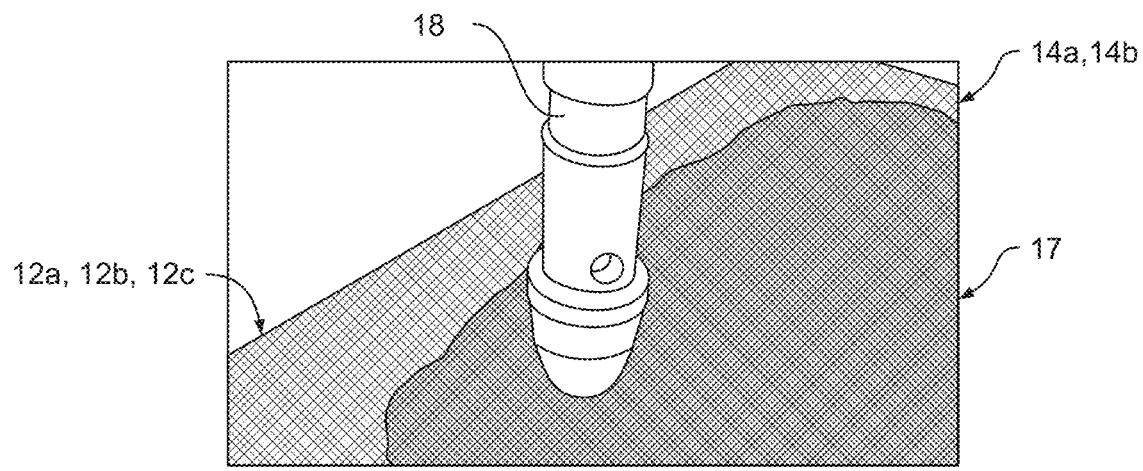

FIG. 9 shows a stack 17 of homogeneously with resin impregnated textile layers comprising the stacked pre-cut fiber fabric layers 12a, 12b, 12c that are fabricated as described above with reference to FIG. 6 to FIG. 8. By way of example, the stack 17 of homogeneously with resin impregnated textile layers is created by removing the PTFE foil 14b from the impregnated fiber fabric layer 12a as well as the PTFE foil 14a from the impregnated fiber fabric layer 12b, and positioning the impregnated fiber fabric layer 12b on the impregnated fiber fabric layer 12a. Then, entrapped air and excessive resin can be squeezed out as described above. Subsequently, the PTFE foil 14b is removed from the impregnated fiber fabric layer 12b as well as the PTFE foil 14a from the impregnated fiber fabric layer 12c, and the impregnated fiber fabric layer 12c is positioned on the impregnated fiber fabric layer 12b. Subsequently, entrapped air and excessive resin can again be squeezed out as described above.

According to one aspect, the wet laminate repair patch 4 of FIG. 3 to FIG. 6 can then be cut out from the stack 17 of homogeneously with resin impregnated textile layers. Illustratively, this is performed by means of a hollow punch 18.

Figure 10:
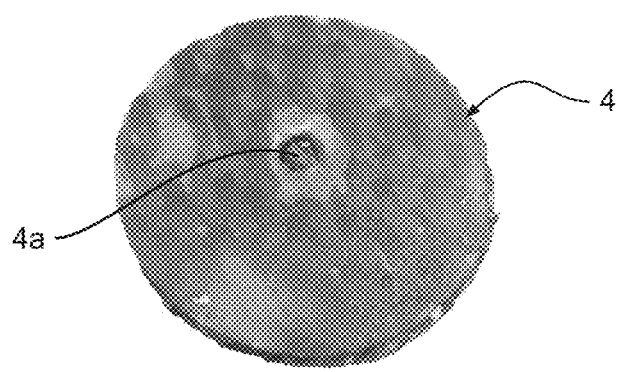

FIG. 10 shows the wet laminate repair patch 4 of FIG. 9. The latter is illustratively provided with the repair patch opening 4a of FIG. 3, e.g. by means of cutting, punching or drilling.

Figure 11:
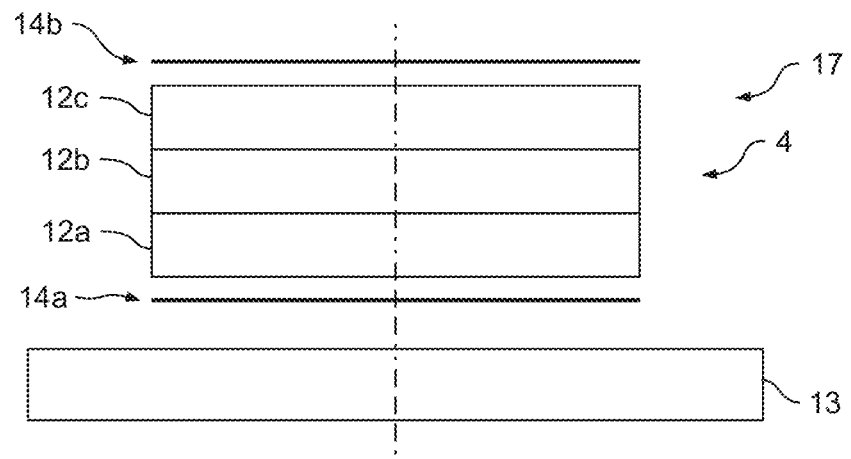

FIG. 11 shows the stack 17 of homogeneously with resin impregnated textile layers of FIG. 9, which is used to create the wet laminate repair patch 4 of FIG. 10. FIG. 11 further illustrates the stacked pre-cut fiber fabric layers 12a, 12b, 12c that are arranged in-between the PTFE foils 14a, 14b. The stack 17 of homogeneously with resin impregnated textile layers is preferably squeezed prior to application to the inappropriate countersink 2a of FIG. 2.

Figure 12:
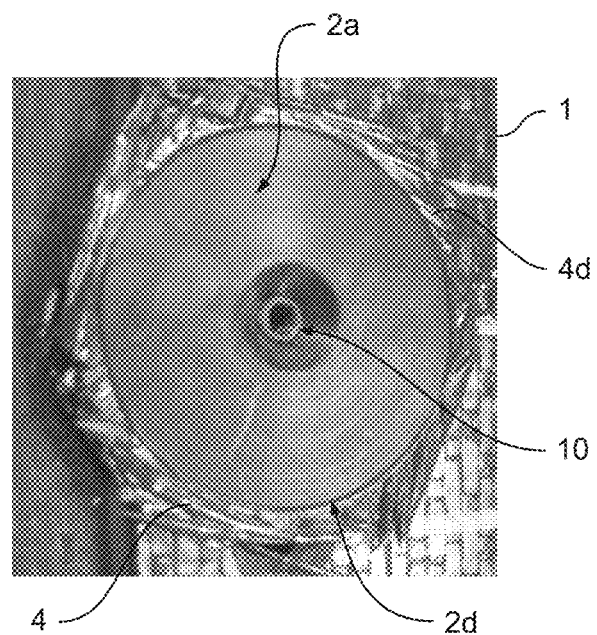
FIG. 12 shows the inappropriate countersink of FIG. 2 that is corrected with a repair patch according to the present invention.

FIG. 12 shows the wet laminate repair patch 4 of FIG. 10, which is illustratively fixed in the inappropriate countersink 2a of FIG. 2 of the composite component 1 of FIG. 2 by means of curing. FIG. 12 further illustrates the excessive repair patch portions 4d of FIG. 4 in the area 2d that surrounds the inappropriate countersink 2a.

REFERENCE LIST 1 composite component
1a appropriate countersink
1b appropriate diameter
1c appropriate depth
1d fixation opening diameter
2a inappropriate countersink
2b inappropriate diameter
2c inappropriate depth
2d countersink surrounding area
3 PTFE tape
3a PTFE tape opening
3b PTFE tape opening diameter
4 repair patch
4a repair patch opening
4b countersink inner area
4c repair patch opening diameter
4d excessive repair patch portions
5 opposite component
5a opposite component opening
6 pressure tool
6a conical extension
6b pressure tool opening
7 pressure application screw
7a screw diameter
8 washer
9 nut
10 fixation opening
11a, 11b, 11c fiber orientations
12a, 12b, 12c pre-cut fiber layers
13 repair patch fabrication support
14a, 14b PTFE foils
15 resin
16 spatula
17 homogeneously with resin impregnated textile layers
18 hollow punch

What is claimed is:

1. A method of correcting, in a composite component, an inappropriate countersink with an inappropriate maximum diameter and/or depth, the inappropriate countersink being provided in the composite component at a fixation opening having a first opening diameter, the method comprising at least the steps of:
preparing a repair patch with a repair patch opening having a second opening diameter that is at most equal to the first opening diameter;
arranging the repair patch on the composite component in an area surrounding the inappropriate countersink, such that the repair patch opening and the fixation opening are at least approximately aligned;
pressing the repair patch at least partly into the inappropriate countersink by means of an associated pressure tool; and
fixing the repair patch in the inappropriate countersink.

2. The method according to claim 1, further comprising at least the steps of:
preparing a polytetrafluorethylene tape with a polytetrafluorethylene tape opening having a third opening diameter that corresponds at least approximately to the inappropriate maximum diameter of the inappropriate countersink; and
arranging the polytetrafluorethylene tape on the composite component in the area surrounding the inappropriate countersink, prior to arranging the repair patch on the composite component, such that the polytetrafluorethylene tape opening and the fixation opening are at least approximately aligned, wherein the polytetrafluorethylene tape is arranged between the repair patch and the composite component.

3. The method according to claim 2,
wherein the step of pressing the repair patch at least partly into the inappropriate countersink comprises at least the steps of:
positioning a conical extension of the pressure tool over the repair patch such that the conical extension is aligned with the inappropriate countersink, wherein the conical extension is provided with dimensions that correspond at least approximately to inverted appropriate countersink dimensions; and
pressing the pressure tool onto the repair patch such that the conical extension presses an inner portion of the repair patch into the inappropriate countersink.

4. The method according to claim 3,
further comprising at least the step of attaching, in a releasable manner, the pressure tool to the composite component by means of an associated clamping unit.

5. The method according to claim 4,
wherein the associated clamping unit comprises at least one screw that traverses the pressure tool and the conical extension, the repair patch, the polytetrafluorethylene tape and the composite component.

6. The method according to claim 4,
wherein the step of attaching the pressure tool to the composite component comprises at least the steps of:
if an opposite component that is to be mounted to the composite component is not already arranged on a surface of the composite component that is opposed to a surface where the repair patch is arranged, arranging the opposite component on the surface of the composite component that is opposed to the surface where the repair patch is arranged; and fixing the associated clamping unit at the opposite component.

7. The method according to claim 1, wherein the step of preparing the repair patch comprises preparing a wet laminate repair patch, wherein the step of fixing the repair patch in the inappropriate countersink comprises curing the wet laminate repair patch in the inappropriate countersink.

8. The method according to claim 7, wherein the step of preparing the wet laminate repair patch comprises fabricating the wet laminate repair patch with a basically quasi isotropic layup.

9. The method according to claim 8, wherein fabricating the wet laminate repair patch with the basically quasi isotropic layup comprises stacking of at least three pre-cut fiber fabric layers having 0°/90°, +/−45° and 0°/90° fiber orientations.

10. The method according to claim 1, further comprising at least the step of removing any excessive repair patch portions from the composite component.

11. The method according to claim 10, wherein the step of removing any excessive repair patch portions comprises grinding the composite component at least in the area surrounding the inappropriate countersink.

12. The method according to claim 10, further comprising at least the step of creating an appropriate countersink with appropriate countersink dimensions subsequent to removing any excessive repair patch portions from the composite component.

13. The method according to claim 1, further comprising at least the step of activating the inappropriate countersink prior to arranging the repair patch on the composite component.

14. The method according to claim 1, wherein the step of preparing the repair patch comprises preparing the repair patch with a structure strength that corresponds at least approximately to an underlying structure strength of the composite component.

15. A method of correcting, in a composite component, an inappropriate countersink with an inappropriate maximum diameter and/or depth, the inappropriate countersink being provided in the composite component at a fixation opening having a first opening diameter, the method comprising at least the steps of:

providing a repair patch with a repair patch opening having a second opening diameter that is at most equal to the first opening diameter;

arranging the repair patch on the composite component in an area surrounding the inappropriate countersink, such that the repair patch opening and the fixation opening are at least approximately aligned;

pressing the repair patch at least partly into the inappropriate countersink by an associated pressure tool; and fixing the repair patch in the inappropriate countersink.

16. The method according to claim 15, further comprising at least the steps of:

preparing a polytetrafluoroethylene tape with a polytetrafluoroethylene tape opening having a third opening diameter that corresponds at least approximately to the inappropriate maximum diameter of the inappropriate countersink; and arranging the polytetrafluoroethylene tape on the composite component in the area surrounding the inappropriate countersink, prior to arranging the repair patch on the composite component, such that the polytetrafluoroethylene tape opening and the fixation opening are at least approximately aligned, wherein the polytetrafluoroethylene tape is arranged between the repair patch and the composite component.

17. The method according to claim 16, wherein the step of pressing the repair patch at least partly into the inappropriate countersink comprises at least the steps of:

positioning a conical extension of the pressure tool over the repair patch such that the conical extension is aligned with the inappropriate countersink, wherein the conical extension is provided with dimensions that correspond at least approximately to inverted appropriate countersink dimensions; and pressing the pressure tool onto the repair patch such that the conical extension presses an inner portion of the repair patch into the inappropriate countersink.

18. The method according to claim 17, further comprising at least the step of attaching, in a releasable manner, the pressure tool to the composite component by an associated clamp.

19. The method according to claim 18, wherein the associated clamp comprises at least one screw that traverses the pressure tool and the conical extension, the repair patch, the polytetrafluoroethylene tape and the composite component.

20. The method according to claim 18, wherein the step of attaching the pressure tool to the composite component comprises at least the steps of:

if an opposite component that is to be mounted to the composite component is not already arranged on a surface of the composite component that is opposed to a surface where the repair patch is arranged, arranging the opposite component on the surface of the composite component that is opposed to the surface where the repair patch is arranged; and fixing the associated clamp at the opposite component.

\* \* \* \* \*